(12) United States Patent
Laubender

(10) Patent No.: US 8,834,029 B2
(45) Date of Patent: Sep. 16, 2014

(54) AXIAL BEARING ARRANGEMENT

(75) Inventor: Jochen Laubender, Markgröningen (DE)

(73) Assignee: Bosch Mahle Turbo Systems GmbH & Co. KG (DE)

( * ) Notice: Subject to any disclaimer, the term of this patent is extended or adjusted under 35 U.S.C. 154(b) by 0 days.

(21) Appl. No.: 13/524,778

(22) Filed: Jun. 15, 2012

(65) Prior Publication Data

US 2012/0321231 A1    Dec. 20, 2012

(30) Foreign Application Priority Data

Jun. 17, 2011    (DE) .......................... 10 2011 077 771

(51) Int. Cl.
*F16C 32/06* (2006.01)
*F16C 17/04* (2006.01)
*F16C 33/10* (2006.01)

(52) U.S. Cl.
CPC ........... *F16C 17/047* (2013.01); *F16C 33/1075* (2013.01); *F16C 33/108* (2013.01); *F16C 2360/24* (2013.01)
USPC .......................................... 384/121; 384/420

(58) Field of Classification Search
CPC ...... F16C 17/042; F16C 17/047; F16C 17/26; F16C 33/101; F16C 33/1075; F16C 33/108; F16C 2360/24
USPC ......... 384/100, 105, 106, 121, 123, 160, 161, 384/240, 243, 368, 420, 425
See application file for complete search history.

(56) References Cited

U.S. PATENT DOCUMENTS

| | | | | |
|---|---|---|---|---|
| 2,899,243 | A | * | 8/1959 | Acterman ..................... 384/121 |
| 3,495,886 | A | | 2/1970 | Roberts et al. |
| 4,348,065 | A | * | 9/1982 | Yoshioka et al. ............. 384/121 |
| 4,772,188 | A | * | 9/1988 | Kimura et al. ................ 384/123 |
| 5,829,338 | A | * | 11/1998 | Chrestoff et al. ............. 384/121 |
| 6,024,495 | A | | 2/2000 | Loos et al. |
| 7,364,363 | B2 | * | 4/2008 | Kim et al. ..................... 384/103 |
| 8,021,105 | B2 | | 9/2011 | Ammann et al. |
| 2007/0206891 | A1 | * | 9/2007 | Szeri ............................. 384/121 |
| 2011/0038716 | A1 | | 2/2011 | Frankenstein et al. |

FOREIGN PATENT DOCUMENTS

| | | |
|---|---|---|
| DE | 330883 C | 12/1920 |
| DE | 487677 C | 12/1929 |
| DE | 916173 C | 8/1954 |
| DE | 971722 C | 3/1959 |
| DE | 19641673 A1 | 4/1998 |
| EP | 2042753 A1 | 4/2009 |
| GB | 1293665 A | 10/1972 |

OTHER PUBLICATIONS

European Search Report for EP-12166613.5.
German Search Report for DE102011077771.7.

* cited by examiner

*Primary Examiner* — James Pilkington
(74) *Attorney, Agent, or Firm* — Rader, Fishman & Grauer PLLC

(57) ABSTRACT

A hydrodynamic axial sliding bearing is disclosed. The bearing includes a substantially planar sliding surface. The bearing includes a bearing surface, wherein the bearing surface separated by a lubricating gap with at least one annularly arranged segment in at least two coaxial ring zones, and wherein each segment comprising a wedge surface and an engagement surface.

20 Claims, 1 Drawing Sheet

AXIAL BEARING ARRANGEMENT

CROSS-REFERENCES TO RELATED APPLICATION

This application is a National Stage application which claims the benefit of German Patent Application No. DE 10 2011 077 771.7, filed Jun. 17, 2011, which is hereby incorporated by reference in its entirety.

TECHNICAL FIELD

The invention relates to a hydrodynamic axial bearing arrangement with a radially outer annual surface and a bearing surface that is separated or can be separated therefrom by a lubricating gap, with annularly arranged segments each comprising a wedge surface and an engagement surface.

BACKGROUND

Such axial bearings arrangements are known from US 2011/0038716 A1. With this known axial bearing arrangement, the segments are each arranged on both sides, that is on the front and the back of an axial bearing disc, which is axially arranged between two sliding surfaces that are moveable relative to each other, in an annular channel, which during the operation of the axial bearing arrangement is filled with hydraulic lubricant, which because of hydrodynamic effects between the wedge surfaces of the segments and the facing sliding surface of the shaft or of the housing is squashed and then forms a supporting trapped film between the engagement surface following the wedge surface and the sliding surface. This trapped film prevents a direct contact between regions of the axial bearing disc and the adjacent sliding surface of the shaft or of the housing. According to US 2011/0038716 A1, the segments are arranged on the front of the axial bearing disc offset in circumferential direction relative to the segments on the back of the axial bearing disc. This serves to reduce the wear of the tools during the production of the axial bearing disc.

In the case of axial bearings of turbochargers, it has to be taken into account that both the turbine wheel as well as the compressor wheel during charger operation can be excited into wobbling movements because of unavoidable imbalances and/or aerodynamic effects. These wobbling movements are transmitted to the shaft with the consequence that the shaft-sided sliding surfaces can wobble relative to the axial bearing disc. Thus, the gap dimensions between the shaft-side sliding surface and the segments changes. This can result in that the supporting force of the trapped film formed by the hydraulic lubricant undesirably drops between a segment and the adjacent shaft-sided sliding surface and can have a direct contact of the sliding surface with the segment as a consequence.

SUMMARY

It is therefore the object of the invention to create an axial bearing arrangement, wherein a hydrodynamic axial bearing is guaranteed even under extreme conditions.

With an axial bearing arrangement of the type stated at the outset, this object is solved in that the segments are arranged in at least two concentric ring zones.

Here it is provided, in particular, that the segments of adjacent ring zones are offset to one another in circumferential direction.

Through the segments being arranged in a plurality of zones and through their arrangement preferentially offset in circumferential direction a network of hydrodynamic supporting regions is created with the consequence that possible wobbling movements of the shaft-sided sliding surface are effectively dampened and a direct contact of the sliding surface with parts of the segments can be excluded.

BRIEF DESCRIPTION OF THE DRAWINGS

In the drawing it shows

DETAILED DESCRIPTION

Figure 1:
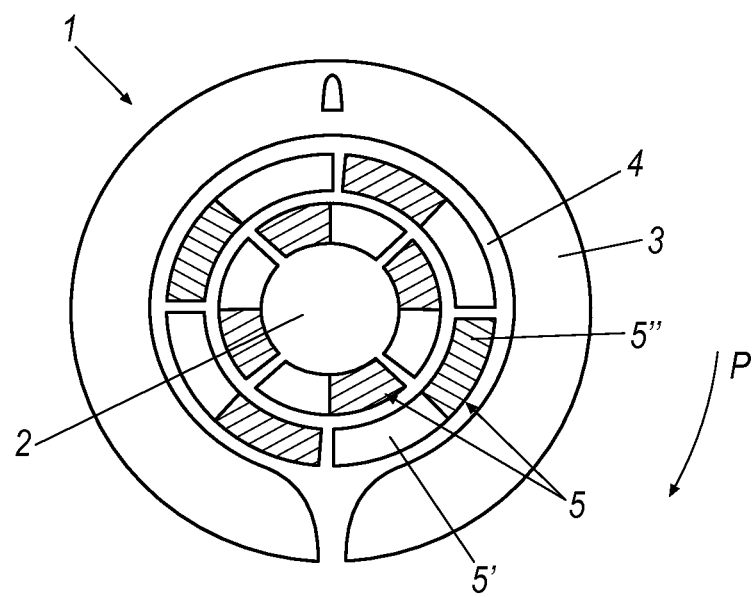
FIG. 1 an axial view of an axial bearing disc configured according to the invention, and FIG. 2 a further axial view of a modified embodiment.

The axial bearing disc 1 shown in FIG. 1 has a central opening 2 in the usual manner, which with assembled axial bearing arrangement is penetrated by the shaft (not shown) to be axially mounted. Here, the face end of the axial bearing disc 1 visible in FIG. 1 can face a shaft-sided collar with shaft-sided sliding surface, while the face end of the bearing disc 1 that is not visible in FIG. 1 faces a relatively stationary sliding or bearing surface in particular on the housing side. It is to be understood that the aforementioned shaft is additionally mounted radially, wherein the corresponding radial bearings in the top view of FIG. 1 can be arranged above the visible face end of the axial bearing disc 1.

Radially between the central opening 2 and a radially outer annular surface 3 a segment zone 4 that is deepened relative to the ring surface 3 is provided, within which segments 5 are arranged in two ring zones which are concentric to the central opening 2. These segments 5 each have an engagement surface 5' and a wedge surface 5". The engagement surfaces 5' extend in a common radial plane, while the wedge surfaces 5" rise ramp-like to the engagement surfaces 5' in arrow direction P from a level that is lower relative to the radial plane of the engagement surfaces 5'.

During the rotational operation of the shaft, the segment zone 5 is filled with fluidic, in particular hydraulic lubricant. When the shaft with its collar now rotates relative to the axial bearing disc in the arrow direction P, lubricant is dragged along between the wedge surfaces 5" and the facing shaft collar within the gap narrowing in arrow direction P, with the consequence that between the shaft collar and the engagement surfaces 5', load-bearing trapped films of the lubricant form each between the shaft collar and the engagement surfaces 5'.

In the event that the shaft and thus the shaft collar should perform wobbling movements relative to the axial bearing disc 1 because of imbalances or other interference forces, this necessarily results in that the thicknesses of the trapped films assume different values. In the case of conventional axial bearing arrangements, wherein the segments 5 are each arranged in only a single ring zone, the wobbling movements can result in that the trapped film undershoots a permissible minimum thickness on one of the segments 5 and thus loses its load capacity so that a direct contact of a shaft part with a part of the axial bearing disc 1 is made possible.

With the invention, by contrast, the segments are provided in a plurality of ring zones. Surprisingly, this results in that an adequately thick and thus load-bearing trapped film is always available on a sufficient number of segments 5 and contacts between shaft and axial bearing disc are excluded. Otherwise, an improved damping of relative movements between shaft and axial bearing disc is achieved through the wide support base that is possible through the invention by way of the segments being arranged in a plurality of ring zones.

The offset arrangement of the segments in the two ring zones also evident from FIG. 1 has also proved to be advantageous for avoiding direct contact between axial bearing elements. In radial direction, a wedge surface of a segment of the one ring zone each lies next to an engagement surface of a segment of the adjacent ring zone. Otherwise, the segments in adjacent ring zones are each arranged within a same circumferential angle, i.e. the segments in a radially outer ring zone have a correspondingly greater length in circumferential direction. With respect to the wedge surfaces, this results in correspondingly reduced wedge angles.

Figure 2:
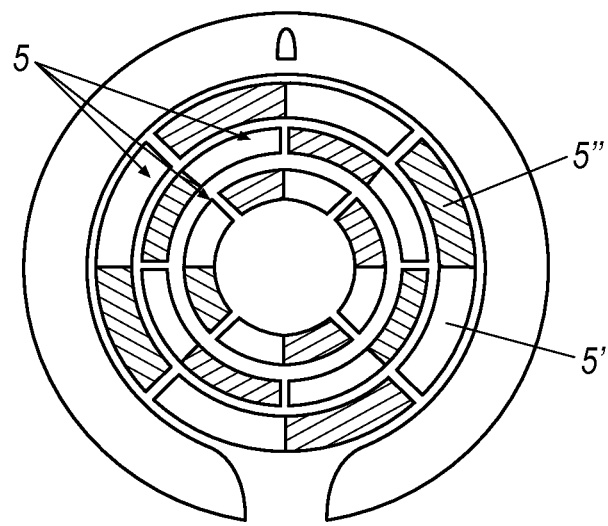

FIG. 2 shows a particularly preferred embodiment, wherein the segments 5 are arranged in three concentric ring zones.

Otherwise, the segments 5 of adjacent ring zones in both embodiments are arranged offset in circumferential direction relative to one another, for example in such a manner that the wedge surface of one segment is located radially adjacent to the engagement surface of the segment in the neighboring ring zone. This means at the same time that the segments of adjacent ring zones each have the same circular measure but have different lengths in circumferential direction.

The embodiments shown as drawings have proved to be advantageous. At the same time, the shown feature combinations are not compulsory.

Initially, the number of the segments 5 can be changed while maintaining the (shown) area conditions between the engagement and wedge surfaces 5' and 5", i.e. the total area of the engagement surfaces 5' on the one hand and the total area of the wedge surfaces 5" on the other hand remain unchanged and are merely divided over a different number of the segments 5. Apart from this, the number of the segments 5 on the segment paths which are concentric to one another can differ, while the segments furthermore can also have different circular measures on different segment paths. In addition to this, it is also possible within one or a plurality of the segment paths to provide segments 5 with circular measures deviating from one another, wherein the area ratio between wedge and engagement area of a respective segment in the segment path can also be different. Because of this, the load bearing behavior can be optimized, specifically with minimal acoustic excitations or instability at the same time. The circular spacings between consecutive segments in circumferential direction can also be varied, if required such that the number of the wedge and engagement surfaces for each pitch circle is different. Finally, all function surfaces, in particular the wedge and engagement surfaces can be embodied with a defined surface structure, e.g. as honed, precision-turned or punched surfaces or such with cross-grind or profilings, such as longitudinal, transverse, diagonal grooves or angular or oval depressions or elevations. By doing so, the trapped film flow between the function surfaces of an axial bearing can be deliberately influenced with respect to a dampening of acoustic excitations or an increase of the stability.

The invention claimed is:

1. A hydrodynamic axial sliding bearing, comprising:
a substantially planar sliding surface; and
a bearing surface with at least two coaxial and radially adjacent ring zones, each of the at least two coaxial and radially adjacent ring zones having at least one annularly arranged segment, and each segment comprising a wedge surface and an engagement surface;
wherein the segments of the at least two coaxial and radially adjacent ring zones are arranged offset to one another in a circumferential direction; and
wherein the segments of at least two coaxial and radially adjacent ring zones each have the same circumferential angle.

2. The axial slide bearing arrangement according to claim 1, wherein the wedge surface of the segment of at least one of the at least two coaxial and radially adjacent ring zones is arranged radially adjacent to the engagement surface of the segment in the other of the at least two coaxial and radially adjacent ring zones.

3. The axial slide bearing arrangement according to claim 1, wherein the bearing surface is arranged on an axial bearing disc.

4. The axial slide bearing arrangement according to claim 1, wherein the wedge surface and the engagement surface have a predefined surface structure.

5. The axial slide bearing arrangement according to claim 1, wherein the wedge surface in each segment rises over a circumferential length to its respective engagement surface from a level that is lower relative to a radial plane of the respective engagement surface.

6. The axial slide bearing arrangement of claim 1, further comprising a segment zone that is deepened relative to the substantially planar sliding surface.

7. The axial slide bearing arrangement of claim 1, wherein the engagement surfaces extend in a common radial plane.

8. A hydrodynamic axial sliding bearing, comprising:
a substantially planar sliding surface; and
a bearing surface with at least two coaxial and radially adjacent ring zones, each of the at least two coaxial and radially adjacent ring zones having at least one annularly arranged segment, and each segment comprising a wedge surface and an engagement surface;
wherein the segments of the at least two coaxial and radially adjacent ring zones are arranged offset to one another in a circumferential direction; and
wherein segments of at least two coaxial and radially adjacent ring zones have different circumferential lengths.

9. The axial slide bearing arrangement according to claim 8, wherein the wedge surface of the segment of at least one of the at least two coaxial and radially adjacent ring zones is arranged radially adjacent to the engagement surface of the segment in the other of the at least two coaxial and radially adjacent ring zones.

10. The axial slide bearing arrangement according to claim 8, wherein the bearing surface is arranged on an axial bearing disc.

11. The axial slide bearing arrangement according to claim 8, wherein the wedge surface in each segment rises over a circumferential length to its respective engagement surface from a level that is lower relative to a radial plane of the respective engagement surface.

12. The axial slide bearing arrangement of claim 8, further comprising a segment zone that is deepened relative to the substantially planar sliding surface.

13. The axial slide bearing arrangement of claim 8, wherein the engagement surfaces extend in a common radial plane.

14. A hydrodynamic axial sliding bearing, comprising:
a radially outer annular surface; and
a plurality of segments arranged in at least two coaxial and radially adjacent ring zones between a central opening and the radially outer annular surface, the plurality of segments of the at least two coaxially and radially adjacent ring zones being offset to one another in a circumferential direction;

wherein:
    the segments of at least two coaxial and radially adjacent ring zones each have the same circumferential angle; and
    each segment comprises a wedge surface and an engagement surface.

15. The axial slide bearing arrangement according to claim 14, wherein the wedge surface of the segment of at least one of the at least two coaxial and radially adjacent ring zones is arranged radially adjacent to the engagement surface of the segment in the other of the at least two coaxial and radially adjacent ring zones.

16. The axial slide bearing arrangement according to claim 14, wherein the wedge surface in each segment rises over a circumferential length to its respective engagement surface from a level that is lower relative to a radial plane of the respective engagement surface.

17. The axial slide bearing arrangement of claim 14, further comprising a segment zone that is deepened relative to the radially outer annual surface of the axial sliding bearing.

18. The axial slide bearing arrangement of claim 14, wherein the engagement surfaces extend in a common radial plane.

19. The axial slide bearing arrangement of claim 14, wherein a segment in a radially outer ring zone has a greater length in a circumferential direction than a corresponding inner ring zone that has the same circumferential angle.

20. The axial slide bearing arrangement of claim 14, wherein the at least two coaxial and radially adjacent ring zones are three coaxial and radially adjacent ring zones, and wherein the segments that have the same circumferential angle alternate in pattern between the wedge surface and the engagement surface between the radially offset coaxial rings.

* * * * *